United States Patent [19]

Waters et al.

[11] 4,445,596

[45] May 1, 1984

[54] ELECTROMAGNETICALLY RELEASED SPRING APPLIED FRICTION BRAKE WITH TORQUE BOOSTER AND DRIVING FORCE DISTRIBUTOR

[75] Inventors: Paul E. Waters, Montecito, Calif.; David S. Vaughan, Erin; Carmen J. Mustico, Jr., Elmira Heights, both of N.Y.

[73] Assignee: Facet Enterprises, Inc., Tulsa, Okla.

[21] Appl. No.: 300,342

[22] Filed: Sep. 8, 1981

[51] Int. Cl.³ .................... B60T 13/74; H02K 7/102
[52] U.S. Cl. ................... 188/171; 188/72.2; 192/54; 192/109 B; 310/77; 310/93
[58] Field of Search .............. 74/574; 188/17, 71.4, 188/72.1, 72.2, 72.3, 136, 156, 161, 163, 171, 173, 196 M, 205 A, 218 R, 218 A; 192/54, 107 C, 109 B, 90; 310/77, 93; 318/372; 464/84, 100, 101, 62; 403/356, 357, 365

[56] References Cited

U.S. PATENT DOCUMENTS

| | | | |
|---|---|---|---|
| 1,896,025 | 1/1933 | Griswold | 464/101 |
| 2,505,120 | 4/1950 | Jackson | 74/574 |
| 2,799,366 | 7/1957 | Zindler | 188/72.2 |
| 2,966,240 | 12/1960 | Aude et al. | 188/171 |
| 2,983,339 | 5/1961 | Neff | 188/171 |
| 3,470,987 | 10/1969 | Kroeger | 188/171 |
| 3,665,231 | 5/1972 | Wendler | 310/77 |
| 3,681,939 | 8/1972 | Timtner et al. | 464/84 |
| 4,079,821 | 3/1978 | Miller | 192/54 |
| 4,142,610 | 3/1979 | Alexander et al. | 310/77 |

FOREIGN PATENT DOCUMENTS

| | | | |
|---|---|---|---|
| 1047664 | 12/1958 | Fed. Rep. of Germany | 464/62 |
| 2404473 | 8/1975 | Fed. Rep. of Germany | 188/171 |
| 2411922 | 9/1975 | Fed. Rep. of Germany | 188/171 |
| 2814200 | 10/1979 | Fed. Rep. of Germany | 188/171 |
| 21764 | 8/1961 | German Democratic Rep. | 464/84 |
| 456678 | 11/1936 | United Kingdom | 188/171 |

Primary Examiner—Douglas C. Butler
Assistant Examiner—R. R. Diefendorf
Attorney, Agent, or Firm—Remy J. VanOphem

[57] ABSTRACT

A compactly sized spring-applied electromagnetically released radial face friction brake, with a ball-pocket torque booster producing increased torque capacity is disclosed. The friction brake is released by energization of an electromagnetic coil attracting an axially movable armature, which nullifies the spring operator force to release the brake. The friction brake includes a driving hub having a plurality of bosses which engage a plurality of slots in a rotatable member to be braked. Thus, the driving force from the hub is distributed to the rotatable member so that both brittle and nonbrittle friction materials can be used to form the rotatable member. In addition, a collar is provided to limit the axial movement between the armature and the stationary ferromagnetic housing which contains the electromagnetic coil therein. Thus, as the friction surface on the rotatable member wears away, the magnetic air gap cannot become so great as to prevent brake disengagement.

17 Claims, 5 Drawing Figures

ELECTROMAGNETICALLY RELEASED SPRING APPLIED FRICTION BRAKE WITH TORQUE BOOSTER AND DRIVING FORCE DISTRIBUTOR

FIELD OF THE INVENTION

This invention relates to electromagnetic brakes and more particularly to axially engaged radial face friction brakes with torque boosters.

BACKGROUND OF THE INVENTION

Disc brakes are sometimes designed to be spring engaged and to be disengaged by an electromagnetic coil energized to attract an axially movable rotatable armature which acts to nullify the spring engagement force and release the brake. The electromagnetic coil, therefore, must be dimensioned to produce a sufficient electromagnetic force to overcome the force of the operator springs as well as residual magnetism forces. The force produced by the springs, in turn, controls the torque capacity of the brake. Thus, the size of the electromagnetic coil is a primary factor in the overall size of the brake unit and also in the cost of its manufacture.

Electromagnetic disc brake devices have been found to be particularly desirable in applications such as controlling computer memory discs. Computer discs have a high inertia yet must be stopped within a short predetermined period of time, for example, in case of a power failure to avoid damage to the pick-up head of the computer disc drive or alternately because of the requirements of the work cycle.

The disc brake construction is particularly advantageous in computer disc applications due to the flexibility of providing large axially directed flux paths, thereby providing a strong brake engaging force over a very short period of time. In addition, a brake utilizing a friction type engagement can readily incorporate a fail-safe feature in case of electrical failures.

The overall axial dimension of the braking device in computer applications, however, is critical, since it is desirable to design the brake with the minimum axial overall length. Hence, it is desirable to minimize the magnetic coil and the electromagnetic coil housing size. One such prior art design is shown in U.S. Pat. No. 4,280,073 to Miller issued July 21, 1981, owned by the assignee of the present application. This design incorporates a ball and pocket torque booster into the brake so as to increase the axial engagement force over that developed directly by the operation of the spring. This design reduces the spring force required for a given brake torque requirement, and hence, the required electromagnetic coil size. The torque booster action is not self-energizing so as to cease upon nullifying of the spring force.

In one embodiment of the aforementioned design, a rotationally fixed, axially movable armature plate is urged away from the coil housing by the spring operators and into engagement with a double-faced brake disc against a fixed braking plate, the brake disc being rotatably mounted to the hub to be braked. The brake disc is of two plate construction with a plurality of opposite pairs of ball pockets formed in adjacent opposite radial faces of each disc with a ball element disposed between each aligned pair. A washer spring urges the brake discs together. Whenever the coil is de-energized, the brake operator spring urges the friction surfaces into engagement with the armature and backing plate, with the reaction forces causing the ball elements to cam the armature into engagement with the corresponding pole face on the coil housing, thereby significantly increasing the engagement force generated by the brake operator springs. After energization of the coil, the spring operator force which is acting on the armature, is nullified, causing the release of the brake with the electromagnetic force required being less than the total axial force generated by the spring and torque booster combination.

The other embodiment of the aforementioned device is designed to be incorporated in an electric motor. Here, the ball elements are disposed in opposite pockets formed in the engaging faces of the electromagnetic coil housing and the armature respectively. The armature is provided with a friction disc spring which is urged into engagement with an annular brake surface provided on the motor fan assembly.

The aforementioned design has several drawbacks. For example, as the friction surfaces wear, the magnetic air gap between the armature and the ferromagnetic housing containing the coil becomes so great as to prevent the brake from disengaging. In addition, due to the increased force on the braking surface, the driving shaft connection of the rotatable member to the brake has a tendency to overstress the spline coupling between the hub and the brake discs. This increased stress produces cracks in the rotatable member resulting in premature failure of the braking device. Furthermore, the aforementioned design is limited to permit the use of frictional material on the rotatable member made from nonbrittle materials, such as asbestos, since the brittle materials, such as carbon graphite, would crack and fail prematurely presumably due to the shock loads applied thereto when the brake is applied. Finally, the aforementioned design is noisy in operation due to the tolerance in the spline connection between the hub and rotatable member.

SUMMARY OF THE INVENTION

The present invention is concerned with an improvement in the construction of friction disc brakes which limits the axial movement of the ferromagnetic armature relative to the stationary ferromagnetic housing to prevent brake lockup and assure brake disengagement when the coil is energized. In addition, the present invention provides a construction which distributes the driving force of the hub to the rotatable member such that the shock loading on the rotatable member is reduced and thus both brittle and nonbrittle friction materials can be utilized for the rotatable member. Finally, the present invention provides a reduction in the noise that normally occurs in the connection between the hub and rotatable members in many prior art design brakes.

The present invention relates to a friction braking device having a stationary ferromagnetic housing and a ferromagnetic armature mounted adjacent to the stationary ferromagnetic housing. In addition, a mechanism for mounting the ferromagnetic armature to the stationary ferromagnetic housing is provided to permit relative axial movement therebetween, while restraining the ferromagnetic armature against free relative rotation. A operator spring mechanism, mounted between the ferromagnetic armature and the stationary ferromagnetic housing, is provided for generating a force urging the ferromagnetic armature axially away from the stationary ferromagnetic housing. A rotatable member is mounted adjacent to the ferromagnetic armature. A friction engagement mechanism is also provided for creating a frictional braking force on the rotatable member by urging the ferromagnetic armature away from the ferromagnetic stationary housing. An electromagnetic mechanism, mounted in the stationary ferromagnetic housing and acting when energized, is provided for urging the ferromagnetic armature axially toward the stationary ferromagnetic housing with a force nullifying the operator spring force. A torque booster mechanism is further provided comprising a non-self-energizing camming mechanism reacting to the torque reaction generated by the friction engagement mechanism so as to increase the axial engagement force of the spring operator mechanism on the ferromagnetic armature only when the electromagnetic mechanism is de-energized. Thus, the axial engagement force of the torque booster mechanism increases the torque capacity of the brake engagement. A hub member is mounted adjacent to the rotatable member and connected thereto so as to distribute the driving force from the hub member to the annular rotatable member. The connection includes a plurality of bosses on the periphery of the hub.

It is, therefore, a primary object of the present invention to provide a spring applied, electromagnetically released brake in which the size of the electromagnetic coil is significantly reduced over conventional designs and which distributes the driving force to the rotatable member to be braked so as to reduce the shock thereto.

It is another object of the present invention to provide an electromagnetically released brake for fail-safe braking application such as computer disc drives, which has increased torque capacity, has a smaller size than prior art designs, and which distributes the driving force to the rotatable member to be braked so as to reduce the shock loading on the friction surface.

It is yet another object of the present invention to provide an electromagnetically released brake which distributes the driving force of the rotatable members to be braked and which limits the axial movement of the armature relative to the electromagnetic housing to a predetermined axial gap therebetween.

It is still another object of the present invention to provide an electromagnetically released brake which distributes the driving force to the rotatable member to be braked and therefore the shock loading to the friction surfaces so as to permit the use of brittle and non-brittle frictional surfaces, as desired.

These and other objects of the present invention will become apparent upon reference to the following drawings and upon reading the specification and the claims which follow.

DETAILED DESCRIPTION OF THE PREFERRED EMBODIMENT

In the following detailed description, certain specific terminology will be employed for the sake of clarity, and specific embodiments described in accordance with the requirements of 35 U.S.C. 112, but it should be understood that this is not intended to limit the invention, inasmuch as the invention is capable of taking many forms and variations within the scope of the appended claims.

Figure 1:
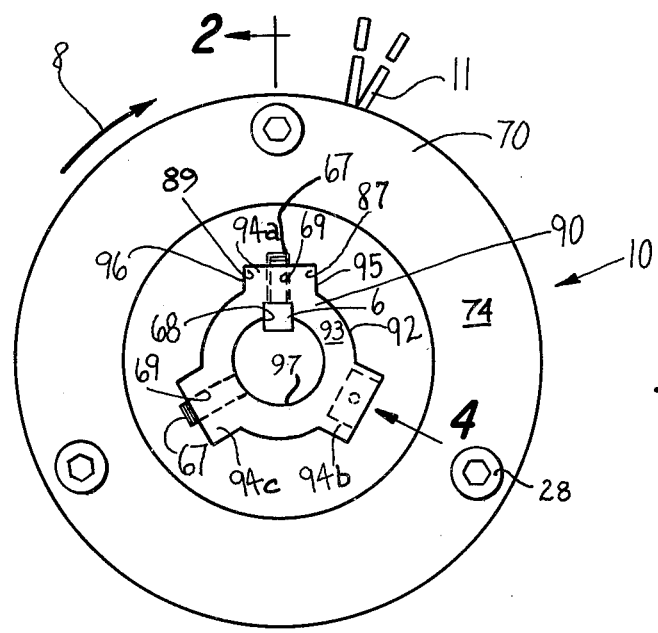
FIG. 1 is an end plan view of the brake device according to the present invention.
Figure 2:
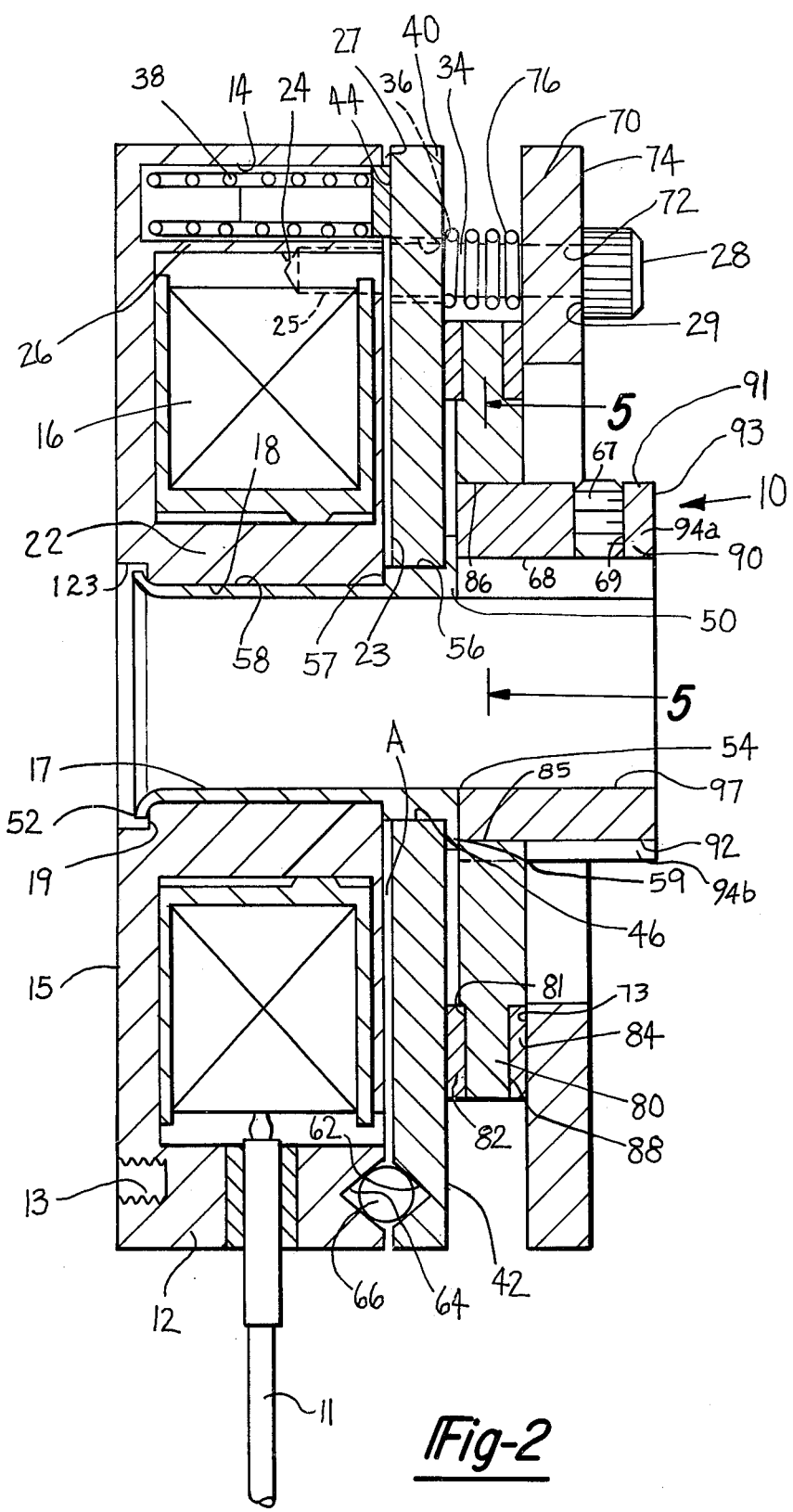
FIG. 2 is a sectional view taken along section line 2—2 of FIG. 1.

Referring to FIGS. 1 and 2, the brake unit 10 includes a stationary magnet body or ferromagnetic coil housing 12 which essentially consists of two concentric annular portions 22 and 26 which form one integral body; an inner body portion 22 and an outer body portion 26. The inner body portion 22 is mounted to the outer body portion 26 in order to form two separate flux conducting paths. The inner magnetic pole face 23 is formed on the inner body and the outer magnetic pole face 27 is formed on the outer body member 26. Between the inner magnetic pole face 23 and the outer magnetic pole face 27 is an annular cavity 24. Thus, the pole faces 23 and 27 are formed on the inner and outer body portions 22 and 26 respectively so that the pole faces are normal to the input shaft axis (not shown) and parallel to the opposite face 44 of the coaxially mounted ferromagnetic armature member 40, described later herein. This specific feature of electromagnetic brakes or clutches, that is, establishing two pole faces, is well known in the art. An electromagnetic winding or coil 16 is mounted in the annular cavity 24 and is contained therein by any suitable adhesive, such as epoxy. The coil or winding 16 may be manufactured of copper wire or any other suitable material and is suitably connected by a connector 11 to a D.C. power source and electrical control means (not shown). The ferromagnetic coil housing 12 is mounted to a stationary structure by suitable fasteners (not shown) extending through threaded opening 13 formed in the outer body 26 of the ferromagnetic coil housing 12.

A ferromagnetic armature member 40 is mounted adjacent to the housing 12 by cap screws 28. Each of the cap screws 28 has a threaded portion 25 which is received in axially extending threaded holes (not shown) formed in the ferromagnetic coil housing 12. The cap screws 28 are also formed with intermediate cylindrical body portions 34 which extend through openings 36 formed in the ferromagnetic armature member 40. Thus, the portion of the cap screws 28 extending through openings 36 provides a loose fit which allows ready axial movement of the ferromagnetic armature member 40 relative to the stationary ferromagnetic coil housing 12. Furthermore, the openings 36 in the ferromagnetic armature member 40 are sufficiently larger than the intermediate cylindrical body portion 34 of the cap screws to permit a limited rotational movement of the ferromagnetic armature member relative to the body portion 34 for a purpose hereinafter described.

The axial movement of the ferromagnetic armature member 40 relative to the stationary ferromagnetic coil housing 12 is further limited by retaining collar 50. The retaining collar 50 has one end 52 flared to engage a shoulder 19 of the inner body member 22 and an opposite end 54, with a first radial shoulder 59 which is larger than the inner diameter 46 of the ferromagnetic armature member 40. Adjacent to the first radial shoulder 59 is a first outer diameter 56 which is slightly smaller than the inner diameter 46 of the ferromagnetic armature member 40. Thus, the armature member 40 is slidably mounted onto the first outer diameter 56 of the retaining collar 50. The retaining collar 50 further has a second inner diameter 58 which is smaller than the first inner diameter 56. Between the first inner diameter 56 and the second inner diameter 58 is a second radial shoulder 57. The second inner diameter 58 of the retaining collar 50 is slightly smaller than the inner diameter 18 of the housing 12. Thus, the retaining collar 50 is secured to the housing 12 by inserting the second inner diameter 58 into the inner diameter 18 of the housing 12 such that the second radial shoulder 57 abuts against the inner pole face 23. The housing 12 further has a counterbore 123 in the radial face 15 to form the shoulder 19 on the housing 12. The one end 52 of the retaining collar 50 is flared radially outwardly to engage the shoulder 19 of the housing 12. The axial movement of the ferromagnetic armature member 40 is thus restricted to move from a first extreme axial position or abutting position against the housing 12 whereby the opposite face 44 abuts the pole faces 23 and 27 to a second extreme axial position whereby the one face 42 of the armature ferromagnetic member 40 abuts against the first radial shoulder 59 of the retaining collar 50. In the preferred embodiment this axial movement between the first and second extreme axial positions or the air gap "A" is set between 0.007 to 0.012 inches.

The ferromagnetic armature member 40 and the outer body portion 26 are each formed with respective facing surfaces 44 and 27, wherein are formed a plurality of oppositely disposed conical ball pockets 62 and 64, respectively. Preferably, the conical ball pockets 62 and 64 consist of three ball pocket pairs equally spaced circumferentially, to provide balanced axial forces. Disposed in each ball pocket pair is a ball element 66.

The cap screws 28 also extend through openings 72 formed in a backing plate 70. The cap screw heads 29 seat on a face 74 of the backing plate 70 to provide an axial stop to absorb the axial reaction forces created by the engagement of the brake unit 10. Helical biasing members 76 act between the ferromagnetic armature member 40 and the back plate so as to urge the ferromagnetic member and the backing plate 70 apart.

Friction braking means attached to a hub 90 are provided to act on the hub whenever the coil 16 is de-energized as will be described herein. The friction braking means includes a braking disc 80 having a pair of friction rings 82 and 84 respectively secured to opposite radial surfaces 81 and 88, respectively. The friction rings 82 and 84 may be formed integrally with the braking disc 80. Alternatively, the friction disc 80 may be formed separately from the friction rings 82 and 84. In the preferred embodiment, the braking disc 80 and the friction rings 82 and 84 may be formed integrally from a brittle material such as carbon graphite, if desired. Alternatively, the friction rings 82 and 84 may be made from a nonbrittle material such as asbestos and the friction disc 80 may be made of cast iron or steel or any other similar material well known in the art. Those skilled in the art will recognize that the choice of friction material will depend on the application, the life expectancy, and the environment within which the brake unit 10 is operating.

The hub 90 may be joined to an input shaft (not shown) to be braked, by a keyway 68 and a key 6 (FIG. 1). Central openings 17 and 97 (FIG. 2) in the retaining collar 50 and the hub 90 respectively, are provided to accommodate an input shaft.

The hub 90 further has an outer diameter 92 upon which are formed radially extending bosses 94a, 94b, and 94c. Preferably, three equally spaced bosses 94a, 94b, and 94c are formed on the hub 90. Each boss 94a, 94b, and 94c has two flats 95 and 96 with a peripheral surface 91 extending therebetween. Each of the bosses 94a, 94b, and 94c is further formed with a front face 93 which is substantially perpendicular to the input shaft (not shown) and facing the viewer when looking at FIG. 1. In two of the three bosses 94a and 94c, a set screw 67 is inserted into a threaded radial aperture 69 so as to further enable securing the hub 90 to the input shaft. The one flat 96 of the third boss 94b, which does not have a set screw 67 and aperture 69 therein, further has an axially extending undercut 99 (FIG. 3) formed therein for a purpose to be described herein later.

Figure 5:
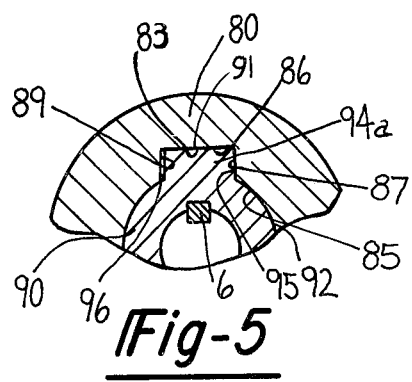
FIG. 5 is a sectional view taken generally along section line 5—5 of FIG. 2.

The hub 90 is joined to the brake disc 80 by means of a plurality of slots 86 formed adjacent to the inner diameter 85 of the brake disc 80, as shown in FIG. 5. The inner diameter 85 is slightly larger than the outer diameter 92 of the hub 90. Each slot 86 has two flats 87 and 89 with a peripheral portion 88 extending therebetween. The peripheral extending portion 88, and flats 87 and 89 conform to the peripheral surface 91 and the flats 95 and 96 of the hub 90. The shape of the slots 86, thus conform substantially to receive one of the bosses 94a, 94b, and 94c of the hub 90.

Figure 3:
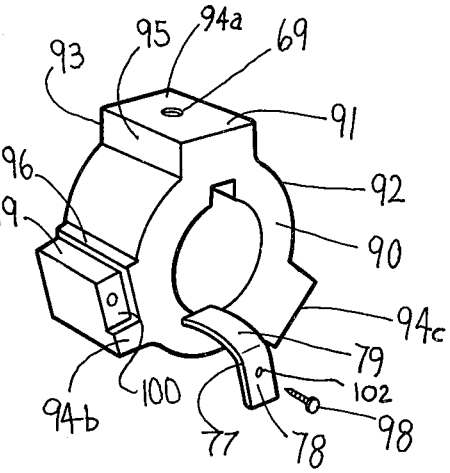
FIG. 3 is a perspective view of the hub and leaf spring as viewed from the end of the hub adjacent the armature plate.
Figure 4:
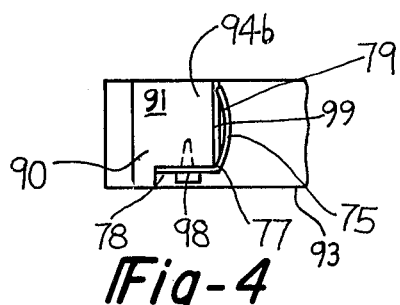
FIG. 4 is a partial elevational view taken along arrow 4 of FIG. 1.

As shown in FIGS. 3 and 4, a leaf spring 77 has a radial portion 78 and an axial portion 79. The radial portion 78 of the leaf spring 77 is fastened to the third boss 94b such that the radial portion 78 is suitably secured to a slot 100 in the front face 93 by means of a pin 98 mounted in an aperture 102 in the radial portion 78. With the radial axial portion 78 thusly secured, the portion 79 is disposed in the undercut 99. The radial portion 78 of the spring does not extend beyond surface 93 of the hub 90 since the undercut 99 is slightly deeper than the thickness of the spring. The axial portion 79 is arcuately shaped and further has an apex 75 which extends slightly above the surface of the flat 96 of the boss 94b. Thus, in assembly, the axial portion 79 of the spring 77 pushes against the flat 89 of its respective slot 86 in the disc 80 so as to urge the one flat 95 of all three of the bosses 94a, 94b, and 94c into contact with their mutually opposing flats 87 of the slots 86 when the hub 90 rotates in the direction 8 shown in FIG. 1. Thus, the leaf spring 77 urges the hub 90 into contact with the brake disc 80. In addition, the leaf spring permits a slight axial movement of the brake disc 80 relative to the hub 90 during engagement and disengagement of the brake to permit the disc brake to seek a self-centering position between the ferromagnetic armature member 40 and backing plate 70. Further, wear of the frictional surfaces is thereby also compensated.

Referring to FIG. 2, the friction rings 82 and 84 are urged into frictional contact with the one face 42 of the armature and with the one face 73 of the backing plate, respectively by a plurality of brake operator springs 38 acting on the opposite face 44 of the ferromagnetic armature member 40. Each of the operator springs 38 are mounted within bores 14 formed in the housing 12. The operator springs 38 have a spring jute which overcomes the biasing force of the return springs or helical biasing members 76 so as to create a frictional braking contact.

OPERATION

With the hub 90 mounted to an input shaft and rotating, and the electric coil 16 de-energized, the brake operator springs 38 urge the ferromagnetic armature member 40 axially away from the pole faces of the ferromagnetic coil housing 12. The ferromagnetic armature member 40 is biased into contact with the rotating friction ring 82 on the braking disc 80 and the back plate 70 is biased into contact with the friction ring 84. Because the ferromagnetic armature member 40 is stationary and the friction disc 80 is rotating, when the ferromagnetic armature member comes into contact with the friction ring 82, there occurs a slight relative rotation between the ferromagnetic armature member 40 and the magnet body of ferromagnetic coil housing 12. This rotation is allowed to occur because the opening 36 in the ferromagnetic armature member 40 is larger than the cylindrical body section 34. Relative rotation causes a camming action to occur between the ball elements 66 and the respective pockets 62 and 64, forcing the ferromagnetic armature member 40 axially away from the ferromagnetic coil housing 12 and into engagement with the friction ring 82. Simultaneously, the friction ring 84 is forced axially into the one face 73 of the backing plate 70, as discussed previously. The force generated by this camming action will be additive to the axial force of the brake operator spring 38 insofar as it is applied to the frictional engagement of the friction rings 82 and 84 with the ferromagnetic armature member 40 and the backing plate 70. Furthermore, since the brake disc 80 is designed to move axially on the hub 90, the braking force is applied evenly to both sides of the brake disc assembly such that both sides of the brake disc assembly are simultaneously in contact with the respective braking surfaces. Thus, this arrangement constitutes a torque booster means increasing the braking engagement force by camming means reacting to the rotational movement of the armature relative to the ferromagnetic coil housing 12 to thereby increase the torque capacity of the brake unit 10.

Upon energization of the coil 16, the armature member 40 which is constructed of ferromagnetic material, as is the coil housing 12, is attracted to the pole faces 23 and 27 by the magnetic flux lines through the air gap "A". The power level of the coil 16 is sufficient to nullify the axial force generated by the brake operator springs 38 and the loss of magnetic flux through the air gap "A".

The ball element 66 in the pockets 62 and 64 are configured such to insure that the self-energization of the camming means does not occur until the electric coil 16 is de-energized. Thus, when the electric coil 16 is energized, the brake is released and the rotating hub and brake disc no longer influences the ferromagnetic armature. The ferromagnetic armature member 40 therefore moves axially towards the ferromagnetic coil housing 12 because of the influence of the magnetic attraction as well as the biasing force of the return springs 76. The effect of the return springs as well as that of the magnetic attraction together result in the ball elements 66 returning to the deepest portion of the mutually opposed pockets and, accordingly, the camming effect is nullified.

It should be noted that only the axial force generated directly by the net spring force between the operator springs 38 and the return springs 76 is required to be nullified by the electromagnetic forces of the coil 16 rather than the total axial engagement force including that generated by the ball element 66. Thus, in effect, a substantially smaller coil 16 in ferromagnetic coil housing 12 may be used for a given brake capacity than that required in conventional designs.

Since the retainer collar 50 permits a predetermined axial movement of the ferromagnetic armature member relative to the ferromagnetic coil housing 12, the air gap "A" does not become excessive after wear occurs on the parts so that the reliable disengagement of the brake assembly 80 is assured when the electric coil 16 is energized. However, as wear occurs on the friction rings 84 and 82, respectively, the relative axial distance between the backing plate 70 and the ferromagnetic armature member 40 may be adjusted by adjustment of the cap screws 28. The adjustment by the cap screws insures that the backing plate 70 and the ferromagnetic armature member 40 engage the friction rings 82 and 84, respectively, even after wear occurs on the friction rings 82 and 84 so as to insure the reliable operation of the brake unit when the electromagnetic coil 16 is de-energized for the full life of the frictional elements.

With the hub 90 rotating in direction of arrow 8 as shown in FIG. 1, the flat 95 of each of the three bosses 94a, 94b, and 94 is urged into contact with the flat 89 of each of the three slots 86 on the brake disc 80 by the biasing force of the leaf spring 77. Thus, the flat 95 of each of the bosses 94a, 94b, and 94c is the driving side, that is, when the driving force of the input shaft is imparted into the braking disc 80 in the direction 8, the flat 95 and respective flat 89 are in driving engagement. Thus, the leaf spring 77 helps to keep the hub 90 and the brake disc 80 in driving contact.

The arrangement also permits a slight axial movement of the brake disc 80 relative to the hub 90 during engagement and disengagement of the brake unit 10 such that the brake disc assembly can remain self-centering. Furthermore, the configuration of the slots 86 and the bosses 94a, 94b, and 94c permits greater tolerance variations between the mating parts without adversely affecting the operation of the brake unit 10. In addition, this combination of the leaf spring 77 acting on bosses 94a, 94b, and 94c in their corresponding slots 86 absorbs some of the shock loading normally experienced on these parts so that the life of the hub 90 and brake disc 80 is enhanced thereby. In addition, the noise that is normally caused by the normal manufacturing tolerances between the mating driving parts, such as the brake disc 80 and the hub 90, is reduced by utilizing the leaf spring 77 as described herein above.

While the preferred embodiment of the invention has been described, it will be apparent to those skilled in the art that changes may be made to the invention within the scope of the appended claims and in some instances, certain features of the invention may be used to advantage without corresponding use of other features. Accordingly, it is intended that the illustrated descriptive materials herein be used to illustrate the principles of the invention and not to limit the scope thereof.

Having thus described the invention, what is claimed as novel is as follows:

1. A friction braking device comprising:
    an annular rotatable member to be braked;
    a first frictional surface on said annular rotatable member;
    a stationary ferromagnetic housing mounted adjacent to said annular rotatable member;
    an annular ferromagnetic armature interposed said annular rotatable member and said stationary ferromagnetic housing;

means for mounting said ferromagnetic armature to said stationary ferromagnetic housing to permit relative axial movement therebetween while restraining said ferromagnetic armature against free relative rotation relative to said stationary ferromagnetic housing;

a second frictional surface on said annular ferromagnetic armature, said second frictional surface being selectively engageable with said first frictional surface to generate therebetween a frictional braking force;

first biasing means, interposed said annular ferromagnetic armature and said stationary ferromagnetic housing, for generating a first predetermined biasing force biasing said annular ferromagnetic armature axially away from said stationary ferromagnetic housing and, thereby, biasing said second frictional surface into engagement with said first frictional surface;

electromagnetic means, mounted in said stationary ferromagnetic housing and selectively energized to generate a second predetermined biasing force larger than said first predetermined biasing force, said second predetermined biasing force being larger than and in the opposite direction from said first predetermined biasing force such that, upon energization of said electromagnetic means, said annular ferromagnetic armature moves axially towards said stationary ferromagnetic housing and disengages said first and second frictional surfaces;

torque booster means comprising non-self-energizing camming means reacting to the torque reaction generated by the engagement of said first and second frictional surfaces to supplement the axial engagement force of said first biasing means on said ferromagnetic armature only when said electromagnetic means is de-energized, whereby the axial engagement force provided by said torque booster means increases the torque capacity of said friction braking device;

a hub member mounted concentrically with said annular rotatable member;

a plurality of slots contiguous with the inner diameter of said annular rotatable member; and a plurality of radial bosses on the periphery of said hub member, said plurality of bosses engaging said plurality of slots such that said hub member drives said annular rotatable member through said slots and said bosses.

2. The friction braking device of claim 1 wherein each of said plurality of bosses further has a width smaller than each of said plurality of slots and further wherein said friction device further comprises second biasing means, interposed at least one of said bosses and its corresponding one of said slots, for maintaining driving contact between one of the sides of each of said plurality of bosses with one of the sides of one of said plurality of slots to reduce the noise generated therebetween during operation.

3. The friction braking device of claim 2 wherein said second biasing means further comprises:
a leaf spring mounted on the non-driving side of said at least one of said plurality of bosses.

4. The friction braking device of claim 1 wherein said annular rotatable member is a brittle friction material.

5. The friction braking device of claim 1 wherein said annular rotatable member is a nonbrittle friction material.

6. The friction braking device of claim 1 wherein said plurality of bosses comprise three bosses; and wherein said plurality of slots comprise three slots.

7. The friction braking device of claim 6 wherein each of said plurality of slots further has a first radial surface, a second radial surface spaced away from said first radial surface and a circumferential arcuate surface portion therebetween.

8. The friction braking device of claim 7 further comprising:
second biasing means, interposed each of said bosses and each of said slots, for urging one side of each of said bosses into contact with one of said first radial surfaces of one of said plurality of slots.

9. The friction braking device of claim 1 wherein each of said plurality of radial slots has a first radial surface, a second radial surface spaced away from said first radial surface, and a circumferential arcuate portion therebetween and further wherein said friction braking device further comprises second biasing means for biasing one side of each of said plurality of bosses to engage each of said first radial surfaces of said plurality of slots.

10. The friction braking device of claim 9 wherein said second biasing means further comprises:
a leaf spring interposed an other side of one of said plurality of bosses opposite said one side and the second radial surface of the one of said plurality of slots associated with said one of said plurality of bosses.

11. The friction braking device of claim 10 wherein said other side of each of said plurality of bosses has an undercut formed thereon, said leaf spring being disposed within said undercut.

12. The friction braking device of claim 10 wherein said plurality of bosses has one face extending perpendicular to said annular ferromagnetic armature and an opposite face adjacent but spaced away from said ferromagnetic armature.

13. The friction braking device of claim 12 wherein said leaf spring is mounted to said one face of said one of said plurality of hubs and extends therefrom between said one of said plurality of hubs and said associated slot.

14. A friction braking device comprising:
an annular rotatable member having an inner diameter and portions defining a plurality of circumferential slots contiguous to said inner diameter and equispaced from one to the other, each of said slots further having a first radial surface, a second radial surface spaced away from said first radial surface, and a circumferential arcuate surface portion therebetween;

a first frictional surface on said annular rotatable member;

a stationary ferromagnetic housing mounted adjacent to said annular rotatable member;

an annular ferromagnetic armature interposed said annular rotatable member and said stationary ferromagnetic housing;

means for mounting said ferromagnetic armature to said stationary ferromagnetic housing to permit relative axial movement therebetween while restraining said ferromagnetic armature against free relative rotation relative to said stationary ferromagnetic housing;

a second frictional surface on said annular ferromagnetic armature, said second frictional surface being selectively engageable with said first frictional surface to generate therebetween a frictional braking force;

first biasing means, interposed said annular ferromagnetic armature and said stationary ferromagnetic housing, for generating a first predetermined biasing force biasing said annular ferromagnetic armature axially away from said stationary ferromagnetic housing and, thereby, biasing said second frictional surface into engagement with said first frictional surface;

electromagnetic means, mounted in said stationary ferromagnetic housing and selectively energized to generate a second predetermined biasing force larger than said first predetermined biasing force, said second predetermined biasing force being larger than and in the opposite direction from said first predetermined biasing force such that, upon energization of said electromagnetic means, said annular ferromagnetic armature moves axially towards said stationary ferromagnetic housing and disengages said first and second frictional surfaces;

torque booster means comprising non-self-energizing camming means reacting to the torque reaction generated by the engagement of said first and second frictional surfaces to supplement the axial engagement force of said first biasing means on said ferromagnetic armature only when said electromagnetic means is de-energized, whereby the axial engagement force provided by said torque booster means increases the torque capacity of said friction braking device;

a hub member mounted concentrically with said annular rotatable member;

a plurality of radial bosses on the periphery of said hub member, said plurality of bosses engaging said plurality of slots such that said hub member drives said annular rotatable member through said slots and said bosses; and second biasing means interposed each of said bosses and each of said slots for urging one side of each of said bosses into contact with one of said first radial surfaces of one of said plurality of slots.

15. The friction braking device as claimed in claim 14 wherein said second biasing means comprises:
a leaf spring mounted to one of said bosses and further extending between the other side of said boss and said second radial surface of the corresponding one of said slots.

16. The friction braking device of claims 1, 2, 3, 15, 14 further comprising:
collar means, extending between said stationary ferromagnetic housing and said ferromagnetic armature, for limiting the relative axial movement of said ferromagnetic armature relative to said stationary ferromagnetic housing such that the air gap therebetween is limited to a predetermined gap and the engaging forces from said electromagnetic means are operative when energized to nullify said first biasing force and to disengage the brake.

17. The friction braking device of claims 1, 2, 15, 14 wherein said torque booster means comprises:
a first plurality of conical pockets in said annular ferromagnetic armature;
a second plurality of conical pockets in said stationary ferromagnetic housing opposite said first plurality of conical pockets, said first and second plurality of conical pockets forming a plurality of conical pocket pairs; and
a plurality of ball elements disposed in said first and second plurality of pockets and further transmitting braking torque through said stationary ferromagnetic housing, through said plurality of ball elements and thence through said ferromagnetic armature when engaged.

* * * * *